June 5, 1956 N. G. CADEGANS 2,749,249
METHOD FOR MAKING A DRY PAINT MIXTURE
Filed Nov. 24, 1952
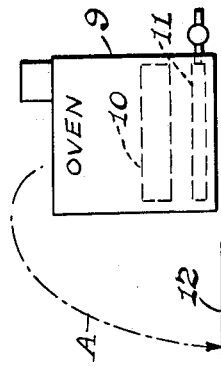
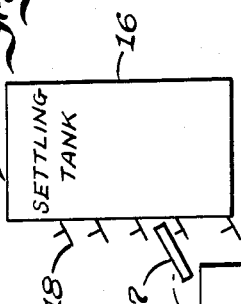
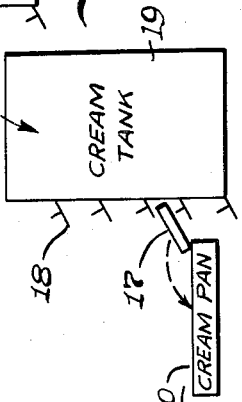
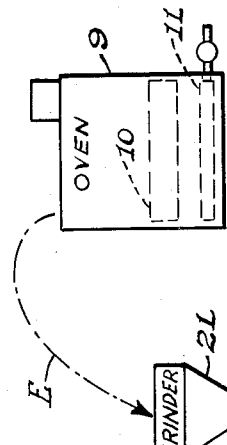
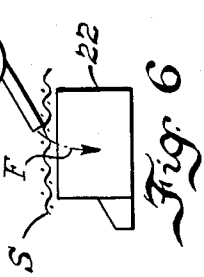
Inventor
Nick G. Cadegans
Atty

United States Patent Office 2,749,249
Patented June 5, 1956

2,749,249

METHOD FOR MAKING A DRY PAINT MIXTURE

Nick G. Cadegans, Beloit, Wis.

Application November 24, 1952, Serial No. 322,363

1 Claim. (Cl. 106—309)

This invention relates to a method for making a dry paint mixture from clays and has for its object producing a dry mixture, capable of being made into a fluid paint by the addition of linseed or other oils.

By following applicant's method, a dry product is produced from certain clays, which, when made into a liquid paint by the addition of certain oils, results in a paint of superior quality and suitable for inside or outside use, and a paint that will not flake, fade or change color when exposed to the sun's rays and action of the elements, moisture or salt water and having long lasting qualities.

In carrying out my method an oven is provided for the reception of pans, whereby the loose clay is first spread over the bottom of a pan, which is placed in the oven and baked for substantially three fourths of an hour at a temperature of substantially 500° F. or higher. This baking process may even change the color of the clay, but what ever color it assumes after baking, its color will be made permanent.

The baked clay is then thoroughly washed and mixed in water until a liquid batter is formed. This name "batter" is considered by applicant an appropriate name for the liquid clay, which is drained into a vertically elongated tank; for example a tank having a capacity of say five hundred gallons. When the tank is full of batter or as full as is desired, it is preferably stirred violently.

Vertically spaced spigots are provided in the batter tank so the spigot spaces will represent say 100 gallons more or less. After stirring I allow the batter to come to rest and after the lapse of one minute or more, cream will have raised to the surface of the batter or down to the nearest spigot.

I provide preferably a three hundred gallon vertically elongated cream tank, into which the first raised cream is drained and then after the lapse of another minute or more and the coarser material in the cream has settled the cream then preferably is drained into a cream tank. The rejected settlings in the bottom of the batter tank may then be drained out as wastage. Generally from one fourth to one half of the original bulk of batter as settlings is unsuited from which to make paint.

Cream is by applicant considered as a suitable name for the material, which raises to the surface of the batter (cream like) and having the necessary texture for a paint.

At this point it should be explained that batter and cream tanks of various capacities may be used to suit mass production methods.

The cream that is drained from the batter tank has a large percentage of water which is permitted to rise to the surface of the cream. A number of spigots are spaced in the cream tank somewhat similar to the arrangement of spigots in the batter tank so the accumulation of water may be drained off from time to time without agitating the cream and the cream may be drained at the most convenient time into dehydrating pans for which an oven is provided. The cream drained into the dehydrating pans is then exposed to a temperature slightly below the boiling point of water and until the cream is completely dehydrated into a dry mass.

The foregoing description is given of the baking, washing, settling and dehydrating process which acts to give the dehydrated cream a desired texture. The dehydrated or dry cream is finally put through a grinder and then through a screen of substantially a 220 mesh, so that the dry mass may be packed in cans and sold as a dry paint mixture. The color of the mixture is printed on the container label which also includes instructions for liquefying the contents into a paint.

In diagrammatic Figures 1–6 Figure 1 designates an oven 9 having one or more vertically spaced pans 10 and a gas heating burner 11 for heating the clay in the pan or pans.

Figure 2 designates the pan 12 in which the baked clay is placed and thoroughly mixed with water, to form the batter which is drained into tank 16 (see Figure 3), by means of spigot 13 at which time the batter in tank 16 is thoroughly manually stirred.

Tank 16 has a number of spaced spigots 18 from any one of which batter may be drained into another tank 19 through a trough 17. Tank 19 also has a number of vertically spaced spigots 18 through which batter may be drained into other pans 10 or water and discarded waste may be drained out.

Figure 5 illustrates another oven 9 having a burner 11 and into which pans 10 may be placed for dehydrating the clay in the pan or pans.

Figure 6 illustrates a grinder 20 having a hopper 21 into which the dehydrated clay is placed, the ground product being drained through a screen S of substantially 220 mesh into a tank 22 from which it may be packed into cans of various sizes, as a base for making paint by mixing with oils, etc.

The dot and dash arrows, which are designated by the letters A to F in the drawing, indicate the sequence of the process steps from the subjecting of the loose clay to a temperature of substantially 500° F. in the oven of Fig. 1 on through to the grinding of the dehydrated cream and passing it through a screen in Fig. 6.

Having thus described my method, I claim:

In a method of making a dry paint composition from clay, comprising, first, subjecting a loose clay to a temperature of substantially 500° F. for substantially three quarter hour, next washing and mixing the clay with water until a liquid batter is formed, next, draining the batter into a vertically elongated settling tank, next, allowing the batter to rest and cream to rise on the surface, next, draining the cream into a vertically elongated cream tank, next, allowing the cream in the cream tank to rest and the coarser material to settle, next, draining the cream into a cream pan, next, subjecting the cream in the pan to a temperature below the boiling point of water until dehydrated, next, grinding the dehydrated cream and forcing it through a screen of substantially 220 mesh.

References Cited in the file of this patent

UNITED STATES PATENTS

| 164,553 | Hall | June 15, 1875 |
| 1,841,309 | Vanderbilt | Jan. 12, 1932 |
| 2,158,987 | Maloney | May 16, 1939 |
| 2,585,116 | Gronroos | Feb. 12, 1952 |

FOREIGN PATENTS

| 12,814 | Great Britain | of 1885 |